(12) United States Patent
Carrigan et al.

(10) Patent No.: US 9,167,824 B2
(45) Date of Patent: Oct. 27, 2015

(54) PROCESS FOR THE PREPARATION OF A REDUCED LACTOSE MILK PRODUCT

(75) Inventors: Denis Carrigan, Kilkenny (IE); Erika Curran, Kilkenny (IE); Denise Keehan, Kilkenny (IE); Richard White, Kilkenny (IE)

(73) Assignee: GLANBIA NUTRITIONALS (IRELAND) LIMITED, Kilkenny (IE)

( * ) Notice: Subject to any disclaimer, the term of this patent is extended or adjusted under 35 U.S.C. 154(b) by 227 days.

(21) Appl. No.: 13/264,247

(22) PCT Filed: Apr. 15, 2010

(86) PCT No.: PCT/IE2010/000022
§ 371 (c)(1),
(2), (4) Date: Oct. 13, 2011

(87) PCT Pub. No.: WO2010/119439
PCT Pub. Date: Oct. 21, 2010

(65) Prior Publication Data
US 2012/0040052 A1 Feb. 16, 2012

Related U.S. Application Data

(60) Provisional application No. 61/202,877, filed on Apr. 15, 2009.

(51) Int. Cl.
| | |
|---|---|
| *A23C 9/12* | (2006.01) |
| *A23C 9/15* | (2006.01) |
| *A23C 9/156* | (2006.01) |
| *A23C 9/158* | (2006.01) |
| *A23C 9/20* | (2006.01) |

(52) U.S. Cl.
CPC .................. *A23C 9/1206* (2013.01); *A23C 9/12* (2013.01); *A23C 9/15* (2013.01); *A23C 9/156* (2013.01); *A23C 9/158* (2013.01); *A23C 9/206* (2013.01)

(58) Field of Classification Search
CPC .......... A23C 9/12; A23C 9/1205; A23C 9/15; A23C 9/156; A23C 9/158; A23C 9/206
USPC .............................. 426/34, 42, 580, 583, 587
See application file for complete search history.

(56) References Cited

U.S. PATENT DOCUMENTS

| | | |
|---|---|---|
| 4,853,246 A | 8/1989 | Stevens |
| 2005/0170044 A1 | 8/2005 | Lange |
| 2007/0014892 A1 | 1/2007 | Mitchell et al. |

FOREIGN PATENT DOCUMENTS

| | | |
|---|---|---|
| EP | 0 558 140 | 9/1993 |
| KR | 1020040103818 | 12/2004 |
| WO | 03/094623 | 11/2003 |
| WO | 2007/021204 | 2/2007 |
| WO | 2007/076873 | 7/2007 |
| WO | 2010/008865 | 1/2010 |

OTHER PUBLICATIONS

G. D. Miller et al., "Benefits of Dairy Product Consumption on Blood Pressure in Humans: A Summary of the Biomedical Literature," Journal of the American College of Nutrition, 2000, vol. 19, No. 2, pp. 147S-164S.
E. Cho et al., "Dairy Foods, Calcium, and Colorectal Cancer: A Pooled Analysis of 10 Cohort Studies," Journal of the National Cancer Institute, Jul. 7, 2004, vol. 96, No. 13, pp. 1015-1022.
A. C. Bulhões et al., "Correlation between lactose absorption and the C/T-13910 and G/A-22018 mutations of the lactase-phlorizin hydrolase (LCT) gene in adult-type hypolactasia," Brazilian Jounral of Medicine and Biological Research, 2007, vol. 40, pp. 1441-1446.
K. Villako et al., "Clinical Picture of Hypolactasia and Lactose Intolerance," Scandinavian Journal of Gastroenterology, 1994, vol. 202, pp. 36-54.
T. Sahi, "Genetics and Epidemiology of Adult-type Hypolactasia," Scandinavian Journal of Gastroenterology, 1994, vol. 202, pp. 7-20.
McGee, Harold, "Milk and Dairy Products," *On Food and Cooking: The Science and Lore of the Kitchen*, New York: Charles Scribner's Sons, pp. 3-53, ISBN 0-684-18132-0.
C. D. Berdanier et al., *Nutrition and Gene Expression*, 1993, Boca Raton: CRC Press, pp. 26-53, ISBN 0-8493-6961-4.
Scrimshaw, N.S. and E.B. Murray, "The acceptability of milk and milk products in populations with a high prevalence of lactose intolerance," American Journal of Clinical Nutrition, 1988, 48 (Suppl 4), pp. 1118-1125, 1129-1136, 1140-1159.
R. Bowen, "Lactose Intolerance (Lactase Non-Persistance)," *Pathophysiology of the Digestive* System, Dec. 28, 2006, Colorado State University.
S.H. Choi et al., "Development of Lactose-hydrolyzed Milk with Low Sweetness Using Nanofiltration," Asian-Aust. J. Anim. Sci., Jun. 2007, vol. 20, No. 6, pp. 989-993.

*Primary Examiner* — Leslie Wong
(74) *Attorney, Agent, or Firm* — Jacobson Holman, PLLC.

(57) ABSTRACT

A process for preparing a low-lactose or lactose free mammalian milk product comprises the steps of enzymatically hydrolyzing the lactose present in mammalian milk, diluting the milk with a lactose-reduced liquid, and adding one or more of a protein, a mineral, a vitamin, a gum, a starch, a stabilizer, and/or an emulsifier to the milk.

38 Claims, 4 Drawing Sheets

PROCESS FOR THE PREPARATION OF A REDUCED LACTOSE MILK PRODUCT

This is a national stage of PCT/IE10/000022 filed Apr. 15, 2010 and published in English, claiming benefit of U.S. provisional application No. 61/202,877, filed Apr. 15, 2009, hereby incorporated by reference.

INTRODUCTION

This invention relates to a process for the full or partial removal of lactose from milk. The invention also relates to a low or zero lactose milk.

Milk and other dairy products are a major source of nutrients in the diet. Milk contains many essential nutrients for normal bodily function and healthy growths such as:
- Protein comprising a substantial and rich amino acid and essential amino acid profile (18 of an approximate 20 known). Protein is necessary for normal growth and development to help build and maintain a strong body.
- Calcium which is necessary for healthy building growth and repair of bones and teeth throughout life. It can contribute to healthy blood pressure.
- Water soluble B vitamins which can control the release of energy from food and contribute to healthy blood and nervous system such as Vitamins $B_2$ and $B_{12}$.
- Potassium which contributes to body electrolyte balance and increased uptake contributes to healthy blood pressure.
- Mineral salts such as potassium and sodium which are necessary for normal water and electrolyte balance throughout the body, magnesium which contributes to healthy metabolism, electrolyte balance and normal nerve and muscle function.
- Iodine which can contribute to healthy neurological development and normal function of the thyroid gland.
- Phosphorous which is necessary for the normal and healthy structure of bones and teeth and healthy metabolism.

As a primary source of calcium in the diet, milk and dairy foods provide the essential substrates for healthy growth and repair of bones throughout life. In the middle and later years, a shortage of calcium may lead to thin, fragile bones that break easily, a condition called osteoporosis. Osteoporosis is a condition characterised by low bone mass and deterioration of bone tissue which increases the risk of bone fracture. Reports on the health benefits of milk have in the past focused mainly on bone health, however it is now recognised that milk and dairy foods have broader benefits on health. Milk and dairy products have been shown to play a role in cardiovascular disease[1] and certain cancers[2].

The composition of milk varies depending on the source. Table 1 below illustrates the differences in the levels of protein, fat and lactose in milks from different mammals.

TABLE 1

Composition of Milk from Different Mammalian Species (per 100 g fresh milk).

| | Protein (g) | Fat (g) | Lactose (g) | Energy (kcal) |
|---|---|---|---|---|
| Cow | 3.3 | 3.9 | 4.6 | 66 |
| Human | 1.3 | 4.1 | 7.2 | 69 |
| Water Buffalo | 4.1 | 9.0 | 4.8 | 118 |
| Goat | 3.1 | 3.7 | 4.4 | 62 |
| Sheep | 5.4 | 5.8 | 5.1 | 93 |

Dairy products are an essential part of a healthy diet and milk has numerous nutritional benefits associated with it however, the carbohydrate or lactose content of milk can present a variance of gastrointestinal discomforts on ingesting milk or milk products.

Lactose is a large and predominant disaccharide sugar present in milk and other dairy products. It comprises two smaller, simpler sugars, glucose and galactose. In normal circumstances the body digests and absorbs lactose in the intestine by lactase an enzyme located on the surface of the cells that line the small intestine. The enzyme splits the lactose into glucose and galactose which are then absorbed into the bloodstream through the intestinal wall.

Lactose intolerance is a non allergic food sensitivity caused by the inability by the body to metabolise or digest and absorb lactose either because the enzyme lactase is absent in the intestinal system or its availability is deficient or lowered. This can result in gastrointestinal symptoms with varying severity following ingestion of products containing lactose.

It is estimated that 75% of adults show some decrease in lactase activity during adulthood worldwide. The frequency of decreased lactase activity ranges from nearly 5% in northern Europe to more than 90% in some Asian and African countries[3].

The most common cause of lactase deficiency is a decrease in the amount of lactase that occurs after childhood and persists into adulthood, referred to as adult-type hypolactasia. This decrease is genetically programmed, and the prevalence of this type of lactase deficiency among different ethnic groups is highly variable. Thus, among Asian populations it is almost 100%, among American Indians it is 80%, and among African Americans it is 70%; however, among American Caucasians the prevalence of lactase deficiency is only 20%. In addition to variability in the prevalence of lactase deficiency, there also is variability in the age at which symptoms of lactose intolerance appear. Thus, among Asian populations, the symptoms of deficiency (intolerance) occur around the age of 5, among African Americans and Hispanic Americans by the age of 10, and among the Finnish by age 20[4].

Symptoms associated with lactose intolerance occur because the unabsorbed lactose passes through the small intestine and into the colon. In the colon, one type of normal bacterium contains lactase and is able to split the lactose and use the resulting glucose and galactose for its own purposes. Disaccharides cannot be absorbed through the wall of the small intestine (where digestion occurs) into the bloodstream, so in the absence of lactase, lactose present in ingested dairy products remains uncleaved and passes intact into the colon. The metabolism of the gut flora quickly switches over to lactose metabolism, and the resultant in vivo fermentation produces copious amounts of gas (a mixture of hydrogen, carbon dioxide and methane). This, in turn, may cause a range of abdominal symptoms, including stomach cramps, bloating, flatulence and lactic acid production.

In addition, as with other unabsorbed unsplit sugars, the presence of lactose and its fermentation products draws water into the colon (by osmosis) leading to loose, diarrhoeal stools. Symptoms begin about 30 minutes to 2 hours after eating or drinking foods containing lactose. The severity of symptoms depends on many factors, including the amount of lactose a person can tolerate and a person's age, ethnicity, and digestion rate[5,6].

Between 30 and 50 million Americans are lactose intolerant and certain ethnic and racial populations are more affected than others. Up to 80 percent of African Americans, 80 to 100 percent of American Indians, and 90 to 100 percent of Asian Americans are lactose intolerant. The condition is less common among people of northern European descent[7]. Babies that are born prematurely are also more likely to be lactose intolerant, because lactase levels do not increase until the third trimester of a woman's pregnancy. The enzyme needed to digest lactose, lactase, reaches its highest levels in the small intestines after birth and then begins a slow decline unless milk is consumed regularly[8].

Berdanier and Hargrove[9] recognise 4 general principles to cope with the undesirable symptoms associated with lactose intolerance: 1) avoidance of dietary lactose; 2) substitution to maintain nutrient intake; 3) regulation of calcium intake; 4) use of enzyme substitute.

Although a lactose avoidance diet will reduce the risk of symptoms, this is nutritionally unwise and usually unnecessary. A concern for both children and adults with lactose intolerance is getting enough bioavailable calcium from a diet that includes little or no dairy products.

Milk and milk-containing products are the best sources of dietary calcium, so it is no wonder that calcium deficiency is common among lactose intolerant persons. This increases the risk and severity of osteoporosis and the resulting bone fractures. It is important, therefore, for lactose intolerant persons to supplement their diets with calcium. It is a good idea for lactose-intolerant persons to take supplemental vitamin D to prevent vitamin D deficiency, a necessary vitamin required to increase absorption of calcium into the body system.

Plant based milk (non-dairy substitute for animal based milk products) and derivatives are the only products that are 100% lactose free e.g. soy milk, almond milk, oat milk, rice milk, peanut milk, horchata. Two of the most common reasons for consuming plant-based milk are lactose intolerance and the observance of a vegan diet. Plant based milk substitutes are not naturally rich in calcium, potassium, or vitamins A or D and, do not contain the rich amino acid protein profile and like all non-animal products, contain no vitamin $B_{12}$.

If plant based milk substitutes are not desired by the consumer an alternative is supplemental use of enzymatic lactase. Lactase enzymes similar to those produced in the small intestines of humans are produced industrially by fungi of the genus aspergillus. The enzyme, β-galactosidase, is available in tablet form in a variety of doses, in many countries without a prescription. The user is required to add the tablet to the milk/milk product and leave for as long as 24 hours for partial or full lactose breakdown.

The options available for lactose intolerant people are to use inconvenient methods of removing/breaking down lactose in milk products or to climatise their pallet to plant milks which have a different sensory flavour profile to mammalian milk while perhaps also taking calcium and other supplements to top up their nutritional intake.

To counteract this, the dairy industry has created quality low-lactose or lactose-free products to replace regular milk and milk products. The vast majority of these comprise a simple processing step of the addition of a commercially available lactase enzyme to milk which will split the lactose disaccharide into glucose and galactose resulting in partial or full hydrolysis as desired. While this method is a simple one, it can markedly change the flavor profile of the milk by adding sweeter notes. Table 2 below illustrates the sweetness equivalence of the disaccharide and monomer equivalent of milk sugar.

TABLE 2

| Relative Sweetness of sugar (sucrose = 100)[22] | |
| --- | --- |
| Lactose | 16 |
| Glucose | 74 |
| Galactose | 32 |

As can be seen from Table 2, lactose is an unsweet sugar that has 16% of the relative sweetness to sucrose. Once lactose is broken down to glucose and galactose by the lactase enzyme, extra sweetness will be imparted to the milk due to the high relative sweetness of glucose and galactose versus lactose. Adding the lactase enzyme has the benefit of keeping the milk nutrients intact, however the consumer will experience a sweeter flavour profile that is not characteristic of milk due to the unsweet lactose.

To counteract this, other technologies have been adopted by some dairies worldwide. Examples of this include—membrane technology whereby filtration, ultrafiltration, diafiltration, chromotagraphical separation of lactose occurs followed by hydrolysis of the remaining lactose enzymatically. However, these technologies are expensive to set up and run.

STATEMENTS OF INVENTION

According to the invention there is provided a process for the partial or full removal of lactose from mammalian milk to prepare a low-lactose or lactose free mammalian milk product comprising the steps of
   (a) enzymatically hydrolysing the lactose present in mammalian milk;
   (b) diluting the milk with a lactose-reduced liquid and;
   (c) adding one or more of a protein, a mineral, a vitamin, a gum, a starch, a stabiliser, and/or an emulsifier to the milk.

The steps may be preformed in any desired sequence.

Prior to carrying out steps a, b, c it is possible to carry out the following optional processes to the raw mammalian milk. Raw mammalian milk is defined as milk containing lactose from one or more of the following groups of mammalian species, cows, goats, sheep, horses, donkeys, camels, buffalo, yaks, reindeer, moose or humans. Also included in the definition of mammalian milk for the purposes of this invention is the option to reconstitute from a milk based powder or other milk concentrates. Optional processes include, vacuum de-aeration, application of thermal treatment e.g. thermisation, pasteurisation, bactofugation, microfiltration, homogenisation or cooling or any other suitable process. The hydrolysed milk may contain about 1% w/v or less lactose. For example, the hydrolysed milk may contain about 0.5% w/v or less lactose, such as about 0.1% w/v or less lactose.

In one embodiment the hydrolysed milk is diluted and the addition is made to the hydrolysed milk.

In one embodiment the addition is made to diluted milk.

In another embodiment the milk is diluted prior to the step of enzymatically hydrolysing the milk.

The addition may be made to the diluted milk prior to the step of enzymatically hydrolysing the milk.

The hydrolysed milk may comprise about 1% w/v or less lactose. In one case the hydrolysed milk comprises about 0.5% w/v or less lactose. The hydrolysed milk may comprise about 0.1% w/v or less lactose.

In one embodiment lactose-reduced liquid is added at a concentration of between about 5% v/v to about 60% v/v. In one case lactose-reduced liquid is added at a concentration of between about 10% v/v to about 50% v/v.

The lactose-reduced liquid may be added at a temperature between about 1° C. to about 45° C.

In one embodiment the lactose-reduced liquid is lactose-free. The lactose-reduced liquid in one case is water.

In one embodiment the protein is a milk protein. The protein may be selected from one or more of: total milk protein, milk protein concentrate, milk protein isolate, zero lactose skimmed milk powder, whey protein isolate, casein, casein salts, and whey protein concentrate.

Alternatively the protein is of a vegetable or cereal source such as wheat, rice, or soya proteins or fungal source myco-proteins.

The protein may be added at a concentration of at least 0.1% w/v. The protein is added at a concentration of at least 10% w/v.

The mineral may be selected from one or more of sodium, potassium, calcium, magnesium, phosphorous, chloride, iron, iodine, selenium, molybdenum, manganese, fluoride, nickel, sulphur, copper and zinc.

The mineral may be added at a concentration of at least 0.0001% w/v. The mineral may be added at a concentration of at least 15% of the recommended daily allowance.

In one embodiment the vitamin is selected from one or more of vitamin A, vitamin B, vitamin C, vitamin D, vitamin E, and vitamin K.

Vitamin A may be added in a retinol form or its equivalent.

Vitamin B may added one or more of the forms: vitamin $B_1$ (thiamine), vitamin $B_2$ (riboflavin), vitamin $B_3$ (niacin), vitamin $B_5$ (pantothenic acid), vitamin $B_6$ (pyridoxine), vitamin $B_7$ (biotin), vitamin $B_9$ (folic acid), vitamin $B_{12}$ (cobalamin), and vitamin B equivalent.

Vitamin D may be added in the form of one or both of: vitamin $D_2$ (ergocalciferol), vitamin $D_3$ (cholecalciferol), and vitamin D equivalent.

Vitamin E may be added in the alpha-tocopherol form or vitamin E equivalent.

Vitamin K may be added in the form of one or a combination of: Phytomenadione, menaquinone-4, menaquinone-7, or vitamin K equivalent.

The vitamin may be added at a concentration of at least 0.0001% w/v.

The vitamin may be added at a concentration of at least 15% of the recommended daily allowance.

In one embodiment the protein and/or mineral and/or vitamin is added to the hydrolysed milk in the lactose-reduced liquid.

In one case the process comprises the step of adjusting the amount of butterfat in the milk to compensate for the dilution with lactose-reduced liquid.

In one embodiment the milk is enzymatically hydrolysed with a lactose and/or B-galactosidase enzyme.

The enzyme may be present at a concentration between about 0.01% w/v to about 0.5% w/v.

The milk may be enzymatically hydrolysed for between about 2 hours to about 36 hours. The milk may be enzymatically hydrolysed at a temperature between about 1° C. to about 45° C.

The process may include one or more of the processing steps selected from: vacuum de-aeration, pasteurisation, bactofugation, homogenisation, separation into cream and skim fractions, and fat content standardisation prior to step (a).

The process may comprise one or more of the processing steps selected from: spray drying, whipping, churning, aerating following step (b) or (c), and pasteurising if raw milk is used.

The mammalian milk source may be one or more of cows, goats, sheep, horses, donkeys, camels, buffalo, yaks, reindeer, moose, and humans.

The invention also provides a milk product comprising less than 1% w/v of lactose, the milk product containing glucose, galactose and an amount of from 5% w/v to 75% w/v of added lactose-free or lactose reduced liquid.

In one embodiment the lactose-free or lactose reduced liquid is added in an amount of from 10% v/v to 50% v/v.

The milk product may comprise less than 0.5% w/v of lactose. The milk product may comprise less than 0.1% w/v of lactose.

The milk product may comprise added vitamin(s) and/or protein(s) in amount(s) to at least compensate for the reduction in the vitamin and protein levels in the milk as a result of the dilution with the lactose free or lactose reduced liquid such as water.

The protein may be a milk protein. The milk protein may be selected from one or more of: total milk protein, milk protein concentrate, milk protein isolate, zero lactose skimmed milk powder, whey protein isolate, casein salts, and whey protein concentrate.

The protein may be of a vegetable or cereal source.

In one embodiment the protein is added at a concentration of at least 0.1% w/v.

The protein may be added at a concentration of at least 10% w/v.

In one embodiment the mineral is selected from one or more of sodium, potassium, calcium, magnesium, phosphorous, chloride, iron, iodine, selenium, molybdenum, manganese, fluoride, nickel, sulphur, copper and zinc.

The mineral may be added at a concentration of at least 0.0001% w/v.

In one case the mineral is added at a concentration of at least 15% of the recommended daily allowance.

In one case the vitamin is selected from one or more of vitamin A, vitamin B, vitamin C, vitamin D, vitamin E, and vitamin K.

Vitamin A may be added in a retinol form or its equivalent.

Vitamin B may be added one or more of the forms: vitamin $B_1$ (thiamine), vitamin $B_2$ (riboflavin), vitamin $B_3$ (niacin), vitamin $B_5$ (pantothenic acid), vitamin $B_6$ (pyridoxine), vitamin $B_7$ (biotin), vitamin $B_9$ (folic acid), vitamin $B_{12}$ (cobalamin), and vitamin B equivalent.

Vitamin D may be added in the form of one or both of: vitamin $D_2$ (ergocalciferol), vitamin $D_3$ (cholecalciferol), and vitamin D equivalent.

Vitamin E may be added in the alpha-tocopherol form or vitamin E equivalent.

Vitamin K may be added in the form of one or a combination of Phytomenadione, menaquinone-4, menaquinone-7, or vitamin K equivalent.

In one embodiment the vitamin is added at a concentration of at least 0.0001% w/v.

The vitamin may be added at a concentration of at least 15% of the recommended daily allowance.

In one embodiment the product comprises added butterfat to at least compensate for the reduction in butterfat level as a result of the dilution with lactose-free solution.

The milk may be from one or more of the following groups of mammalian raw milk: cows, goats, sheep, horses, donkeys, camels, buffalo, yaks, reindeer, moose or humans.

In one case derived from powdered reconstituted milk powder sources.

In one embodiment the lactose-free or lactose reduced milk is a stand alone lactose reduced or lactose free milk, flavoured milk, butter milk, acidified milk, flavoured buttermilk, flavoured acidified milk, fruit and milk combination, or as a lactose free or lactose reduced cream, sour cream, crême fraiche, whipped cream, culinary cream, pouring cream, coffee cream, clotted cream, butter (sweet cream or cultured/sour), butter (salted/unsalted), dairy spread, dairy/vegetable oil combination spread, margarine, buttermilk, cheese—all types, quarg, yogurt, drinking yogurt, lassi, kefir, milk powder, whole milk powder, lactose free skimmed milk powder, fat filled milk powder, condensed milk, evaporated milk, ice-cream, custard, mousse or combination thereof.

The product may comprise ingredients selected from flavours, fruit and fruit derivatives, nuts and nut derivatives, cereal or cereal derivatives, cocoa and cocoa derivatives, carbohydrates, proteins vegetable or cereal, fats from dairy or vegetable/cereal source, sugars and sweeteners, acids, stabilisers, emulsifiers, colours, and preservatives.

In the context of the invention the term "reduced lactose milk" means a milk from a mammalian source that has been processed to reduce the amount of lactose in the processed milk compared to the unprocessed milk. Typically, reduced lactose milk will have a lactose content of about 1% or less such as a lactose content of about 0.1% or less.

The process may involve thermal treatment of the standardised milk whereby thermal treatment can range from LTLT (low temperature long time) (63° C. for 30 min), HTST (high temperature short time) (for milk typically minimum 72° C. for minimum 15 seconds, or for cream HTST minimum 80° C. for a minimum of 1 second), ultra pasteurisation of minimum 125° C. for a minimum of 2 seconds, or UHT (Ultra high temperature) minimum 135° for a few seconds or sterilisation in container minimum 115° C. for minimum 20 minutes.

BRIEF DESCRIPTION OF THE DRAWINGS

The invention will be more clearly understood from the following description of an embodiment thereof, given by way of example only, with reference to the accompanying drawings, in which.

DETAILED DESCRIPTION

We describe a process for preparing a milk product having reduced lactose content. The reduced lactose or lactose free milk has substantially similar nutritional content as a full lactose milk product. The process also provides a reduced lactose product having the same creamy mouthfeel with a high quality flavour delivery that is the same as or superior to a full lactose containing product. The process described herein provides a simple method of preparing lactose reduced or lactose free milk without the need to employ expensive lactose separation technology. The process described herein can be considered as a simple and cost effective method for making a reduced lactose or lactose free milk without the requirement of expensive technology such as filtration/membrane/chromatographic separation technology being installed into a dairy manufacturing plant. The reduced lactose or lactose free milk may have no additional sweetness, or may have a higher relative sweetness such as is desirable from a sensory perspective depending on national preferences and may have a reduced calorific value while retaining the flavour, taste and nutritional values of a full lactose containing milk.

In particular, the process includes a reformulation step that involves re-formulating enzymatically hydrolysed reduced lactose or lactose free milk to produce an excellent tasting lactose free or reduced lactose milk product that tastes as good as a lactose containing milk. The process described herein does not require expensive technology and does not use by-products, including permeate and retentate of filtration technology.

The invention provides a simple and extremely cost effective method for producing a good quality reduced lactose or lactose free milk product that does not require multiple expensive processing steps.

In one aspect, the process includes the steps of enzymatically treating mammalian milk with lactose enzyme to hydrolyse lactose to galactose and glucose either before or after reformulating the milk by the addition of one or more of a milk protein and or a cereal or vegetable protein, a mineral, a vitamin, and a lactose free or lactose reduced liquid.

Enzymatic Hydrolysis

The step of hydrolysis or breakdown of the lactose sugar in milk may be achieved by the addition of a lactose hydrolysing enzyme to milk. Lactase catalyzes the hydrolysis of one mole of lactose (a disaccharide) to one mole each of the monosaccharides glucose and galactose.

Lactose can be hydrolyzed to D-glucose and D-galactose at pH 6.6 in the presence of the enzyme b-galactosidase and water. Lactase enzyme activity can be inactivated by sanitisers such as iodine, chlorine or hydrogen peroxide and it is essential that all measures are put in place for example rinsing measuring/weighing containers before use to prevent the inactivation of lactase during processing. Lactase activity is also inhibited by products containing monosaccharides for example corn sweeteners, fructose, polydextrose or honey therefore such ingredients if required, should be added after enzyme hydrolysis has taken place to avoid inactivation of lactase. Lactase activity is stable between about pH 6.0 to about pH 8.0 with a significant reduction in activity around about pH 5.5. Lactase is stable up to around about 40 to about 41° C. with a drop in activity around about 43° C. Optimum hydrolysis occurs at about 37° C.

The practice of enzyme addition can take the form of manual addition for example, weighing the ingredient and adding it manually to the formulation for example into a mixing apparatus by a mixer, funnel, tank or by dosage equipment which consists of metered dosing of required enzyme into a line, venturi type mixer or tank. Enzyme addition may also be possible at the packing stage of the process by means of dosing at the filling stage.

Figure 1:
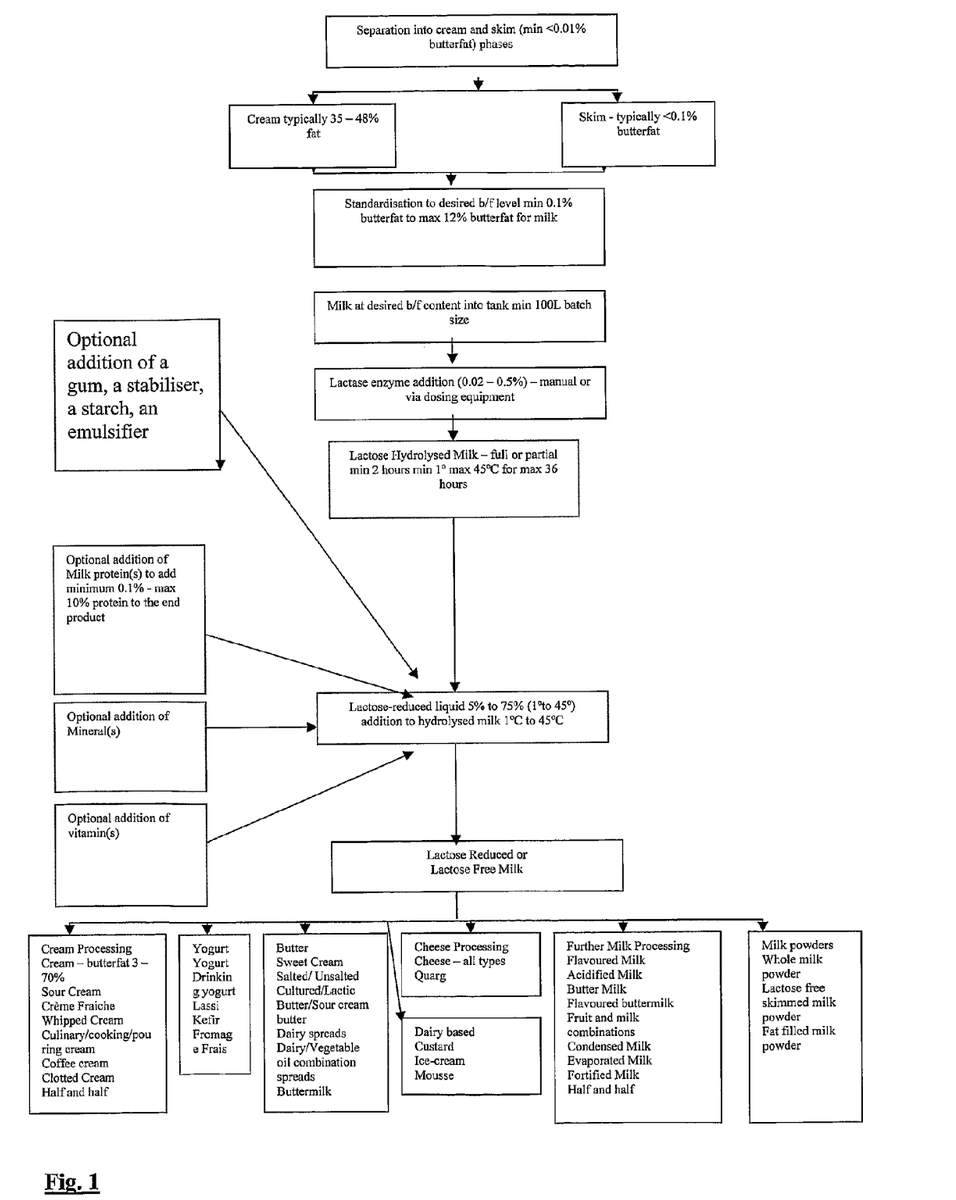
FIG. 1 is a flow diagram showing the processing steps for producing lactose reduced or lactose free milk in accordance with an embodiment of the invention.
Figure 2:
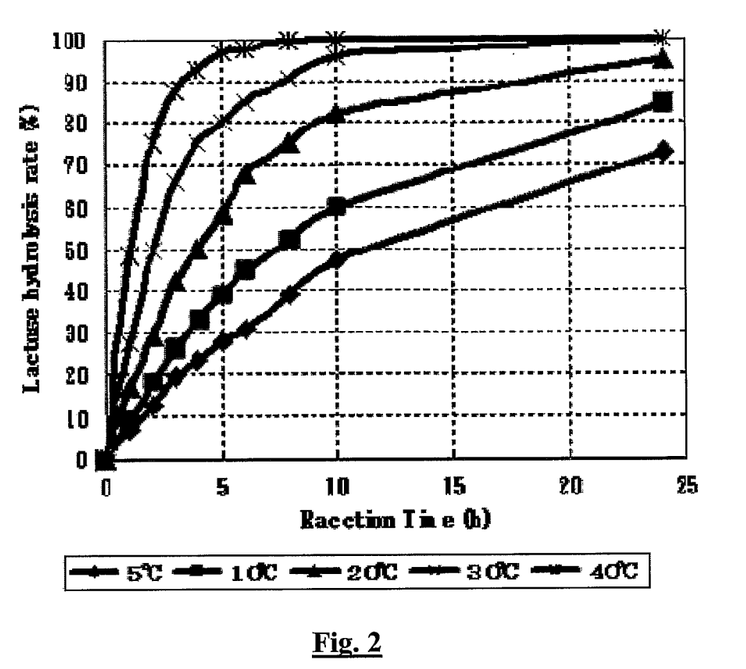
FIG. 2 is a graph showing the effect of temperature on the rate of hydrolysis of lactose.

The speed of lactase hydrolysis in milk is dependant on three main factors dosage, time and temperature. Referring to FIG. 2, the rate of lactose hydrolysis in this case at a dosage of 0.2% is temperature dependant. Lower temperatures result in slower rates of lactose hydrolysis e.g. 5° C. at a dosage of 0.02% will result in approximately 70% hydrolysis 24 hours after addition. Incubating the lactase dosed milk at 20° C. with lactase at a dosage of 0.02% will result in approximately 95% lactose hydrolysis 24 hours post addition of lactase enzyme. 100% hydrolysis will be achieved at 40° C. approximately 8 hours post addition of lactase enzyme dosage at 0.02%. Table 3 below illustrates the relationship between the rate of hydrolysis and dosage rate.

TABLE 3

Dosage Rate of Lactase enzyme and effects on hydrolysis in milk samples stored at <6° C.

| Hours post Dosage | Dosage Rate | Lactose Content per 100 ml |
|---|---|---|
| 8 | ×2 | 20 mg |
| 10 | ×2 | 0 mg |
| 16 | ×1.5 | 0 mg |
| 22 | ×1 | 20 mg |
| 24 | ×1 | 0 mg |

From Table 3 it can be seen that doubling the dosage addition of lactase enzyme speeds the process considerably with full hydrolysis achieved after 10 hours. Full hydrolysis was achieved for milk samples dosed at 1.5 times the dose rate at 16 hours post addition of enzyme whereas full hydrolysis was not achieved for single dose milk samples until 24 hours post dosage.

The temperature at which the milk is stored during lactose hydrolysis can range from a minimum of about 1° C. to a maximum of about 40° C. Above 40° C. lactase activity can diminish rapidly. The dosage rate of lactase can be between about 0.01% to about 0.5%. Other dosage concentrations can be used as long as the end product is not affected negatively from a sensory perspective. For the purposes of this invention the time at which the hydrolysis can take place can typically range from a minimum of 2 hours to 36 hours. It is envisaged that incubation times greater than 36 hours will be possible in an industrial processing plant.

Table 3 above demonstrates that a wide range of times and lactase concentrations can be applied. A wide temperature range and the different points of addition of the lactase enzyme can also be applied to achieve a substantial equivalent hydrolysis for the purposes of this patent.

The hydrolysis process may take place in batches whereby a required quantity of milk is stored in an appropriate sized milk tank for the time and temperature required to achieve full or partial lactose hydrolysis. Dosing of the enzyme can also occur in a continuous process whereby it is possible to dose the enzyme into the milk flow at any stage of the plant post pasteurisation. Dosing can also take place at the filling stage whereby measured quantities are dosed into each pack as it is filled. Hydrolysis takes place once the enzyme is added.

Diluting the Lactose Hydrolysed Milk

Lactose free or lactose reduced liquid may be added to the end product of the hydrolysis treatment step. This liquid such as water performs two basic functions: reduction of the sweetness of the hydrolysed end product by diluting the sweet characteristic imparted by glucose and galactose in the enzyme hydrolysed milk; and to aid in the dispersion of the constituent or constituents as described in the reformulating step below.

The final volume of lactose free or lactose reduced liquid can range from a minimum of about 5% v/v of the final product to a maximum of about 75% v/v of the final product. The temperature of the lactose free or lactose reduced liquid can typically range from between about 1° C. to about 45° C. Higher or lower temperature regimes are possible with this invention.

Reformulating the Hydrolysed Milk

One or more constituents may be added to the hydrolysed milk to normalise the taste of the reduced lactose or lactose free milk compared to the taste of lactose containing milk. The constituents may be added to the lactose free or lactose reduced liquid used to dilute the reduced lactose or lactose free milk as described above.

There are a number of constituents that can be added to the reduced lactose or lactose free milk to control the taste, these include, but are not limited to, one or more of:

Milk Protein

One or more milk proteins selected from the following groups consisting of TMP (Total Milk protein), MPC (milk protein concentrate), MPI (milk protein isolate), zero lactose skimmed milk powder, WPI (whey protein isolate), casein, casein salts and WPC (whey protein concentrate) or any other suitable dairy protein may be added to the reduced lactose or lactose free milk.

The protein may also derive from a non-dairy vegetable or cereal protein source e.g. wheat, rice, soya proteins or fungal source mycoproteins.

Protein can be added in the range of from about 0.1% w/v to about 10% w/v protein content to the end product. For particular end uses such as dairy based high protein shakes, dairy formulations for the elderly, sports drinks and the like, protein in an amount in excess of about 10% w/v can be added to the reduced lactose or lactose free milk.

Vitamins

One or more vitamins from the following group: Vitamins A, B, C, D, E, K may be added to the reduced lactose or lactose free milk.

Vitamin A may be added in one or more of its retinol forms or an equivalent.

Vitamin B may be added as one or more of the following forms or an equivalent: Vitamin $B_1$ (thiamine), Vitamin $B_2$ (riboflavin), Vitamin $B_3$ (niacin), Vitamin $B_5$ (pantothenic acid), Vitamin $B_6$ (pyrodoxine), Vitamin $B_7$ (biotin) [also known as vitamin H], Vitamin $B_9$ (folic acid) [also known as vitamin M], and Vitamin $B_{12}$ (cobalamin).

Vitamin D may be added in one or more of the following forms Vitamin $D_2$ (ergocalciferol) and Vitamin $D_3$ (cholecalciferol) or an equivalent.

Vitamin E may be added as alpha-tocopherol or an equivalent.

Vitamin K may be added as Phytomenatione, Menaquinone-4 and/or Menaquinone-7 (vitamin $K_2$) or an equivalent.

The vitamin or vitamins can be added as a liquid, powder, pre-emulsion, emulsion in their equivalent acid or salt forms. The vitamin or vitamins may be added to the lactose free or lactose reduced liquid used to dilute the lactose hydrolysed milk as described above.

The vitamin(s) or combination thereof can impart negligible nutritional value to the end product for example providing from about 0.0001% RDA. The RDA of vitamins is set out in Table 4 below. The values below are subject to change on the occurrence of legislative amendments and therefore are included as the current RDA's but variations of this data are possible. The maximum level of addition could be in the region of imparting about 150% of the recommended daily allowance to the end product nutritional profile. However, the amount of vitamin added could vary depending on the particular end use, for example larger amount of vitamin (in excess of 150% RDA) could be added to dairy formulations for specific purposes or nutritional use.

TABLE 4

Vitamin Recommended daily allowances in accordance with EC Council Directive 90/496 EC and amended version 2008/100/EC on nutrition labeling for foodstuffs

| Vitamin | RDA* | Vitamin | RDA |
|---|---|---|---|
| Vitamin A | 800 µg | Folic Acid Vitamin $B_9$ | 200 µg |
| Vitamin D | 5 µg | Vitamin $B_{12}$ | 2.5 µg |
| Vitamin E | 12 mg | Thiamin Vitamin $B_1$ | 1.4 mg |
| Vitamin K | 75 µg | Pantothenic Acid Vitamin $B_5$ | 6 mg |
| Riboflavin Vitamin $B_2$ | 1.6 mg | Biotin Vitamin $B_7$ | 0.15 mg (150 µg) |
| Vitamin C | 80 mg | | |
| Niacin Vitamin $B_3$ | 18 mg | Pyrodoxine Vitamin $B_6$ | 2 mg |

*Recommended Daily Allowance

Minerals

A single mineral or combination of minerals may be added to the reduced lactose or lactose free milk. The single mineral or combination of minerals may include of one or combination of the following: Sodium, Potassium, Calcium, Magnesium, Phosphorous, Chloride, Iron, Manganese, Copper, Iodine, Selenium, Molybdenum, sulphur, cobalt, nickel, fluoride, chromium and Zinc.

The mineral(s) or combination thereof may impart negligible nutritional value to the end product (0.0001% to RDA). The RDA of minerals is set out in Table 5 below). The maximum level of addition may be in the region of imparting 150% of the recommended daily allowance to the end product nutritional profile. However, the amount of mineral added could vary depending on the particular end use, for example larger amount of mineral (in excess of 150% RDA) could be added to dairy formulations for specific purposes or nutritional use.

TABLE 5

Mineral recommended daily allowances in accordance with EC Council Directive 90/496 EC and amended version 2008/100/EC on nutrition labeling for foodstuffs

| Mineral | RDA* | Mineral | RDA |
|---|---|---|---|
| Calcium | 800 mg | Sodium | 600 mg |
| Phosphorous | 800 mg | Potassium | 2000 mg |
| Iron | 14 mg | Chloride | 1.1 mg |
| Magnesium | 375 mg | Selenium | 55 ug |
| Zinc | 15 mg | Molybdenum | 50 ug |
| Manganese | 2.3 mg | Flouride | 3.5 mg |
| Chromium | 40 ug | | |
| Iodine | 150 µg | Copper | 1 mg |

*Recommended Daily Allowance

Sulfur, Cobalt, Nickel, chromium, fluoride have no RDA allocated but can be added from at least 0.001% w/v of the final product The diluted single or multi-constituent blend may be mixed with partially lactose hydolysed or fully lactose hydrolysed milk. It is also possible to add the diluted mix to milk unhydrolysed milk where the enzyme can be added at the fill to pack stage of the process. The inclusion of a diluted blend may be performed under agitation, circulation or by any other means to ensure adequate mixing of the blend into the lactose hydrolysed milk.

Optional Processing Steps

Figure 3:
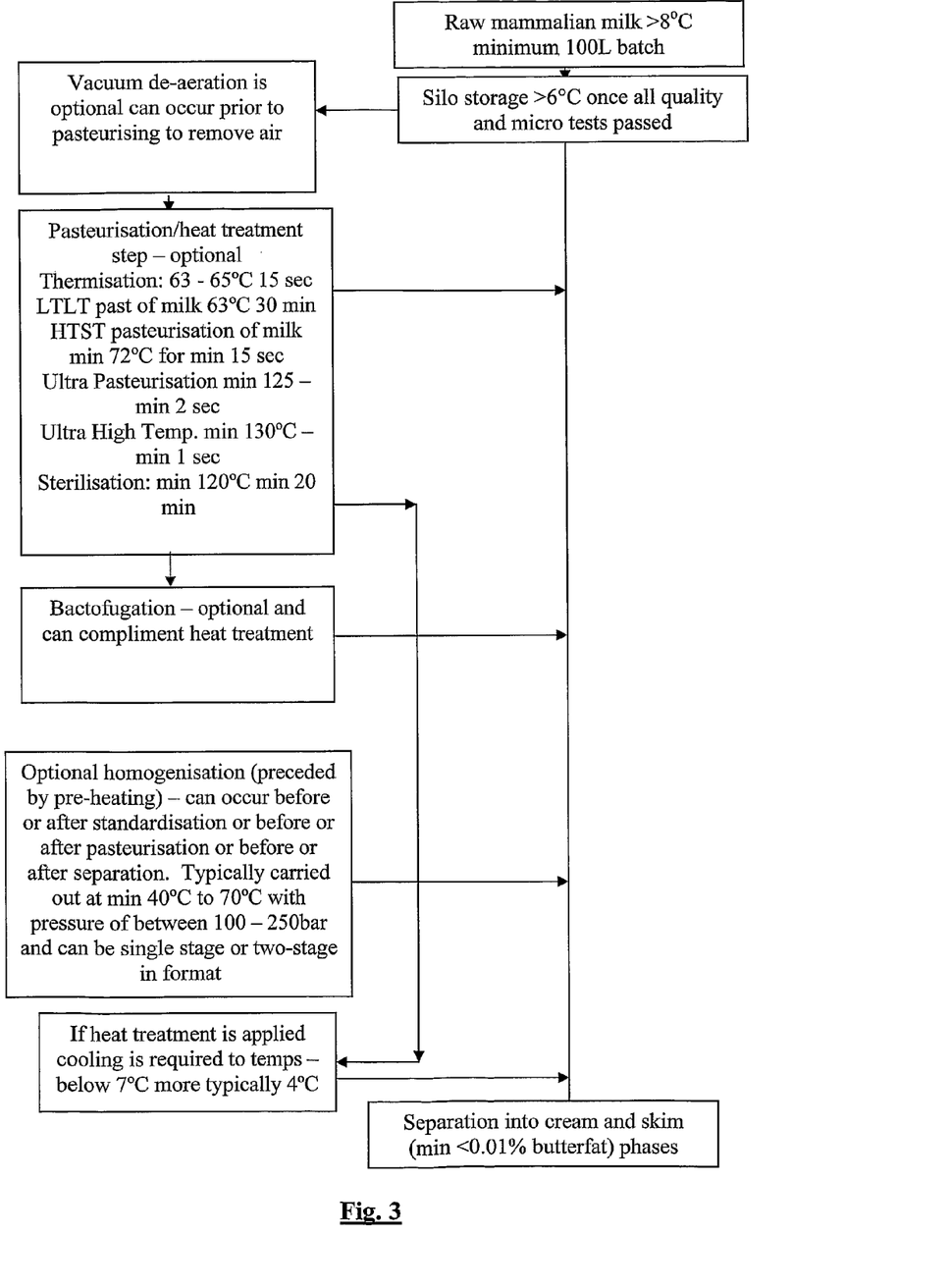
FIG. 3 is a flow diagram showing some of the optional processing steps in accordance with an embodiment of the invention.
Figure 4:
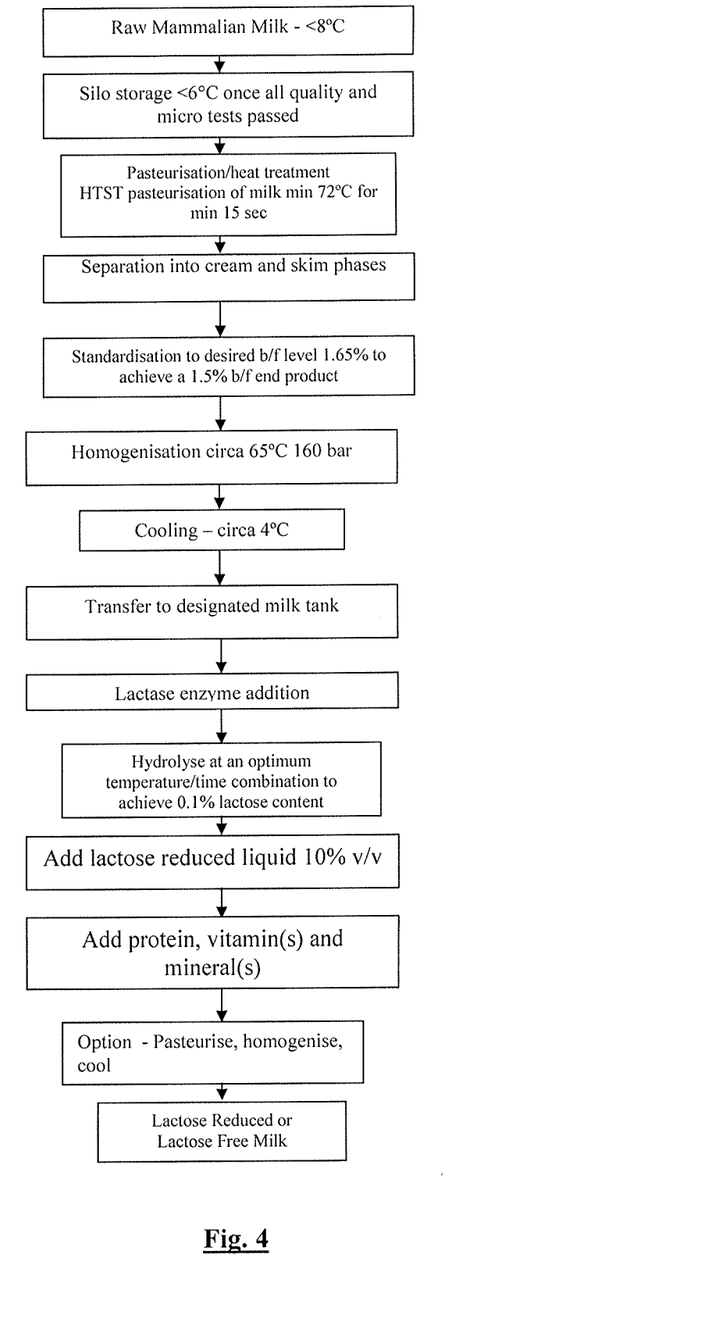
FIG. 4 is a flow diagram showing preparation of low lactose semi-skimmed milk according to Example 1.

The process may include one or more additional step such as pasteurising the milk, standardising the butter fat content of the milk, separating milk into skim and cream phases, vacuum de-aeration to remove bulk air from the milk, or homogenisation. These steps are optional and may vary depending on the desired properties of the reduced lactose or lactose free milk. The process described herein may also incorporate additional optional conventional milk processing steps such as one or more of thermal treatment, homogenisation, fermentation, spraydrying, whipping, churning, aerating. FIG. 3 depicts some of the optional processing steps.

It is possible to add additional ingredients to the hydrolysed milk blend for example one or more of the following non-limiting ingredients including flavours, fruit and fruit derivatives, nuts and nut derivatives, cereal or cereal derivatives, cocoa and cocoa derivatives, carbohydrates, proteins vegetable or cereal, fats from dairy or vegetable/cereal source, sugars and sweeteners, acids, stabilisers, emulsifiers, colours, preservatives.

In a typical example, raw bovine milk was separated into skim and cream phases on the basis of the percentage of butterfat in each of the phases. Typically the skim phase contains less than about 0.1% butter fat. Both of the skim and cream phases may be used to standardise the milk to the desired fat content for example full fat milk, semi skimmed milk, or skimmed milk. The separation step allows for phases containing a different butterfat content compared to the conventional butterfat ranges of milk to be separated from the raw milk.

Standardising the Butter Fat Content of Reduced Lactose Milk

Standardisation of the desired fat content involves adjustment of the fat content of the reduced lactose milk with the addition of known fat contents cream and milk phases to obtain a desired fat content. Once the fat contents of both the cream and milk (skim) phases have been calculated by laboratory testing, it is possible to calculate how much of the cream and skim phases to add to the reduced lactose milk to give the desired fat content using a simple equation. For example: in which A: Skimmilk fat content 0.07%
B: Cream fat content 40%
C: Desired fat content of end product 2.5%

Firstly a series of three subtractions (always the smaller value from the larger) are performed
1. C−A=D
2. B−C=E
3. B−A=F (The difference between the fat content of both cream and milk phases)—this result is always used as a division numeral arising from the two values (D and E) calculated by subtractions 1 and 2 above.

Referring to table 6 below, the values of A to F have been tabulated for ease of reference.

TABLE 6

Fat standardisation (Milk - 2.5% butterfat)

| Fat % of components | Desired Fat % | Result % | |
|---|---|---|---|
| A 0.07 (Skim phase) | C 2.5 | 93.9% | Milk |
| B 40 (Cream phase) | D 2.43 | 6.1% | Cream |
| (B − A = F) F 39.93 | (C−A−D) (B − C = E) E 37.5 | 100 | |

Next the amount of milk and cream phases to be added to the milk is calculated using the equations:
D/F=% Milk in formulation required to give the desired fat content in the milk to be hydrolysed
E/F=% Cream required in formulation to give the desired fat content in the milk to be hydrolysed The sum of both components (milk and cream phases) must equate 100% in total ensuring the equation has been carried out correctly.

It is possible, to standardise the reduced lactose milk at any butterfat content desired with this process. In one embodiment, a higher butterfat content than is desired may be added at this stage and lactose free or lactose reduced liquid added at a later stage will dilute the butter fat content to the level required.

Standardisation can occur by manually calculating the quantity of cream and skim to be added as outlined in the above equation. Alternatively, standardisation can take place by manually adding a quantity of cream to the formulation. Butter fat testing of the final blend of reduced lactose milk will ensure adequate quantities of cream/skim have been called.

Typically, final butterfat content can range from a minimum of about 0.01% to a maximum of about 12%.

Pasteurisation

Although raw milk may be consumed without pasteurisation, it is usually pasteurised (heat treated) to destroy harmful pathogenic bacteria, viruses, protozoa, moulds and yeasts. Brief heating to a high temperature can have the same effect as longer exposure to a lower temperature. Pasteurising generally consists of heating the milk to a high temperature for a short period of time to substantially reduce the number of micro-organisms, thereby reducing the risk of disease. For example, pasteurising the milk for short or long shelf life products usually ranges from heating the milk to about 63° C. for about 15 seconds (thermisation) to low temperature long time treatment regimes such as heating the milk to about 63° C. for about 30 min, to high temperature short time (HTST) heat treatment of milk that requires heating the milk to at least about 72° C. for at least about 15 seconds, or in the case of cream heating the cream to at least about 80° C. for at least about 1 second. Milk may also be subjected to ultra high temperature (UHT) pasteurisation that involves heating the milk to at least about 125° C. for at least about 2 seconds, or at least about 135° C. for at least 2 seconds.

Bactofugation

Bactofugation is a process which is specifically designed to separate micro-organisms from milk. Bactofugation is an efficient method of removing heat resistant spores from the milk. The bactofuge technology can make a useful complement to thermisation, pasteurisation and sterilisation as described above and is an optional treatment step in the process described herein.

Homogenisation

Although milk may be consumed without homogenisation, it is usually homogenised to achieve the desired texture consistency and to prevent larger fat globules from rising or creaming off the body of the milk to form a layer at the top. Homogenisation primarily disrupts fat globules into smaller globules consequently diminishing creaming and the tendency for globules to clump or coalesce. Homogenisation can be carried out using single stage or two stage homogenisation processes depending on the desired end product. Single stage homogenisation can be used for products that require high viscosity. Two stage homogenisation can be used for products with a high fat content or when high homogenisation efficiency is desired. The effect of homogenisation on the end product has many advantages particularly in the case of mammalian milk. Included in the list of advantages is a whiter, fuller bodied flavour, better mouthfeel with reduced sensitivity to fat oxidation. It is not suitable to include a homogenisation step in the processing of certain products for example, some creams and cheese production.

A pre-heating step is required before and during the homogenising step to ensure adequate preparation of the fat globule in order for it to be broken down into smaller uniform fat globules. Preheating may also be used in the production of cheese and yogurt to varying degrees. The step of preheating generally includes heating to a temperature between about 40° C. and about 70° C.

Pasteurising, separating, standardising and homogenisation are common processing steps in milk production but are not required to produce consumable dairy products such as cheese, butter, yogurts and the like. One or more of the optional processing steps may be included or omitted from the process described herein depending on the final product being made. Some dairy products may also undergo processing steps in addition to or apart from the processing steps described herein.

The reduced lactose or lactose free milk described herein can be used to make the following products—a stand alone lactose reduced or lactose free milk, flavoured milk, butter milk, acidified milk, flavoured buttermilk, flavoured acidified milk, fruit and milk combination, or as a lactose free or lactose reduced cream, sour cream, crème fraiche, whipped cream, culinary cream, pouring cream, coffee cream, clotted cream, butter (sweet cream or cultured/sour), butter (salted/unsalted), dairy spread, dairy/vegetable oil combination spread, margarine, buttermilk, cheese—all types, quarg, yogurt, drinking yogurt, lassi, kefir, milk powder, whole milk powder, lactose free skimmed milk powder, fat filled milk powder, condensed milk, evaporated milk, ice-cream, custard, mousse or combination thereof.

The invention will be more clearly understood from the following examples.

EXAMPLES

Bovine milk was used in the following examples however, mammalian milk from other species, either singly or a combination thereof, are suitable for use with the process described herein. Milk is a nutritious fluid secreted by the mammary glands of female mammals for the nourishment of their young. The female ability to produce milk is one of the defining characteristics of mammals. Mammalian raw milk from cows, goats, sheep, horses, donkeys, camels, buffalo, yaks, reindeer, moose or humans or combinations thereof may be used in the process described herein.

Example 1

Characteristics of a Reduced Lactose Milk Product

In this example, a semi-skimmed lactose containing milk with average nutritional composition per 100 ml was used as a comparative example. The standard semi-skimmed milk was used without any nutritional alterations or any additional processing further to the standard dairy practices known in the art of dairy processing. The nutritional values described in Table 6 are average in nature and are subject to change dependant on seasonal variation and species of animal used to produce the milk.

Reformulating the Reduced Lactose Milk

The enzymatically hydrolysed milk was reformulated to standardise the nutritional profile of the reduced lactose milk compared to untreated milk. The reduced lactose milk was diluted with 10% lactose reduced liquid such as water to dilute the sweetness caused by the presence of glucose and galactose. The addition of lactose reduced liquid to the reduced lactose milk also has the effect of diluting the concentration of other nutritional constituents of the milk such as protein, calcium, potassium and vitamin $B_2$. In this example the concentration of protein, calcium, potassium and vitamin $B_2$ in the reduced lactose milk was also reformulated. Butterfat was standardised at a higher level than normal dairy practices to compensate for the 10% added lactose reduced liquid included in this example.

Preparation of Reduced Lactose Semi-Skimmed Bovine Milk

In more detail, the step involving protein, mineral(s) and vitamin(s) may be represented as follows:

Add Protein (one or more milk proteins selected from the following groups consisting of TMP (Total Milk protein), MPC (milk protein concentrate), MPI (milk protein isolate), zero lactose skimmed milk powder, WPI (whey protein isolate), casein, casein salts and WPC (whey protein concentrate), or any other suitable dairy protein). The protein may also derive from a non-dairy vegetable or cereal protein source e.g. wheat, rice, soya proteins or fungal source mycoproteins. Quantity for the purposes of this example is 0.34 g to achieve 3.4 g/100 ml as a desired quantity in the end product.

Add Calcium (one of more calcium salts selected for the following but not limited to carbonate, chloride, gluconate, lactate, phosphate or other suitable calcium salt). Quantity required for the purposes of this example is 12 mg/100 ml to achieve 120 mg/100 ml as a desired quantity in the end product.

Add Potassium (one or more of the following chloride, hydroxide, carbonate or other suitable potassium source for a food application). Quantity required for the purposes of this example is 15 mg/100 ml to achieve 150 mg/100 ml as a desired quantity in the end product.

Add Riboflavin (Vitamin $B_2$). Quantity required for this example is 0.024 mg/100 ml or 0.9 mg/100 ml in order to achieve 15% RDA. Overdosage will be required to ensure adequate levels at end of shelf life.

Fat

Adding 10% lactose reduced liquid to the reduced lactose milk dilutes the fat content of the milk. There are two options for standardising the fat content compared to non-processed milk.

The first option is to separate and standardise the butterfat at a higher level than standard milk to achieve the desired endpoint. In this case the desired end point is 1.5 g/100 ml fat to achieve a semi-skimmed milk. Butterfat standardisation would be 1.65 g/100 ml (0.15 g/100 ml to be compensated for) prior to addition of lactose reduced liquid in order to achieve the desired endpoint of fat content 1.5 g/100 ml.

Calculation example of quantities of cream and skim phase of known butterfat contents is outlined herein.

| Lactose reduced Milk 1.65% | | | |
|---|---|---|---|
| Butterfat % of components | Desired Fat % | % Quantity Required | |
| A. 0.07 - skim phase | C. 1.65 | 96.0 | Milk |
| B. 40 - cream phase | (C − A = D) D. 1.58 | 4.0 | Cream |
| | | 100 | |
| (B − A = F) F. 39.93 | (B − C = E) E. 38.35 | | |

The second option is to add cream at the same time as diluting the reduced lactose milk with lactose reduced liquid in order to achieve 1.5 g fat per 100 ml. The example calculation will determine the quantity of cream of a known butterfat content to add to the milk.

It is also possible to standardise the fat content to any level desired from 0.01 g/100 ml to 12% (12 g/100 ml) butterfat for milk. Alternatively, depending on the requirements for the final product, it may not be necessary to alter the butterfat standardisation process in the reduced lactose milk.

Protein

Adding 10% lactose reduced liquid will have a diluting effect on protein content 100 ml from 3.4 g to 3.06 g (10% reduction). Therefore to meet the desired protein nutritional or sensory composition of 3.4 g/100 ml 0.34 g/100 ml (10% of 3.4 g) of protein was added.

It is possible to use a single protein or a combination of proteins to reformulate the reduced lactose milk. Protein from one or more milk, proteins selected from the following groups consisting of TMP (Total Milk protein), MPC (milk protein concentrate), MPI (milk protein isolate), zero lactose skimmed milk powder, WPI (Whey protein isolate), casein, casein salts and WPC (whey protein concentrate), or any other suitable dairy protein is possible. The protein may also derive from a non-dairy vegetable or cereal protein source e.g. wheat, rice, soya proteins, or fungal source mycoproteins.

It is also possible to fortify the reduced lactose milk with protein in higher amounts than 10%. Alternatively, depending on the requirements for the final product, it may not be necessary to alter the protein concentration in the reduced lactose milk.

Calcium

Adding 10% lactose reduced liquid reduced the calcium content per 100 ml from 120 mg to 108 mg (10% reduction). Therefore to meet the desired nutritional composition 12 mg (10% of 120 mg) of calcium was added. One or more calcium salts selected for the following but is not limited to carbonate, chloride, gluconate, lactate, phosphate or other suitable calcium salt can be used. Quantity required for the purposes of this example is 12 mg/100 ml to achieve 120 mg/100 ml as a desired quantity in the end product. It is possible with this patent invention to alter the nutritional aspects if desired, but it is also possible to add ingredients for sensory improvement reasons only.

It is also possible to fortify the reduced lactose milk with calcium up to a level of 150% RDA in the end product. Alternatively, depending on the requirements for the final product, it may not be necessary to alter the calcium concentration in the reduced lactose milk.

Potassium

Adding 10% lactose reduced liquid reduced the potassium content per 100 ml from 150 mg to 135 mg (10% reduction). Therefore if desired to include potassium as a mineral in the formulation to meet the desired nutritional composition 15 mg (10% of 150 mg) of potassium will need to be added. In some circumstances, it may be necessary to overdose the levels of potassium to be added to the reduced lactose milk to overcome potassium content losses that may be associated with heat treatment or natural losses of potassium that may occur throughout shelf life.

Potassium from one or more of the following but not limited to chloride, hydroxide, carbonate or other suitable potassium source for a food application is possible. Quantity required for the purposes of this example is 15 mg/100 ml to achieve 150 mg/100 ml as a desired quantity in the end product.

It is also possible to fortify the reduced lactose milk with potassium up to a level of 150% RDA in the end product. Alternatively, depending on the requirements for the final product, it may not be necessary to alter the potassium concentration in the reduced lactose milk.

Vitamin B$_2$

Adding 10% lactose reduced liquid reduced the Riboflavin content per 100 ml from 0.240 mg to 0.216 mg per 100 ml. If it is desired to achieve the original nutritional level for Vitamin B$_2$ for non-treated milk to the lactose reduced counterpart it is necessary to add back the 10% (0.024 mg/100 ml) of Vitamin B$_2$.

If on the other hand it is desired to have riboflavin at the recommended daily allowance (RDA) concentration in the end product, as a general rule 15% of the RDA is seen as a starting point referring to 100 g or 100 ml of the product relating to RDA for making a nutrient claim.

The RDA for Riboflavin is 6 mg, 15% of which is 0.9 mg. It is possible to add at least 0.9 mg of riboflavin to the lactose milk if the end product is required to contain riboflavin at an RDA concentration.

Vitamins are in most cases sensitive to heat and losses can occur due to heat treatment. Losses of vitamins can also occur throughout the shelf life, therefore an excess of riboflavin may be added in order to achieve the desired final concentration.

The quantity of Riboflavin (Vitamin B$_2$) required for this example is 0.024 g/100 ml to achieve a similar nutrient profile as the untreated semi-skimmed milk for this vitamin or 0.9 mg/100 ml in order to achieve 15% of the RDA.

It is also possible to fortify the reduced lactose milk with Riboflavin up to a level of 150% RDA in the end product. Alternatively, depending on the requirements for the final product, it may not be necessary to alter the riboflavin concentration in the reduced lactose milk.

Overdosage will be required to ensure adequate levels at end of shelf life.

If the mouthfeel or the viscosity of the liquid was too thin it is also possible to add one or more but not limited to the following, gums, stabilisers, starches and emulsifying ingredients.

Table 7 below details the nutritional content of reformulated reduced lactose milk compared to standard milk.

TABLE 7

Typical Composition per 100 ml of a standard lactose containing semi-skimmed bovine milk and a reduced lactose semi-skimmed bovine milk.

| Nutrient | Lactose containing semi-skimmed bovine milk (average content per 100 ml) | Reduced lactose semi-skimmed bovine milk (average content per 100 ml) |
|---|---|---|
| Energy (kcal) | 44 | 39.6 |
| Protein | 3.4 g | 3.06 g |
| Carbohydrate | 4.8 g | 4.32 g |
| Of which sugars | 4.8 g | 4.32 g |
| Of which glucose | 0 g | 2.11 g |
| Of which galactose | 0 g | 2.11 g |
| Of which lactose | 4.8 g | 100 mg |
| Fat | 1.5 g | 1.5 g |
| Of which saturates | 1.0 g | 1.0 g |
| Fibre | Nil | Nil |
| Sodium | 55 mg | 49.5 mg |
| Calcium | 120 mg | 120 mg |
| Vitamin B12 | 0.4 µg | 0.36 µg |
| Phosphorous | 95 mg | 90.25 mg |
| Potassium | 150 mg | 150 mg |
| Iodine | 15 µg | 13.5 µg |
| Vitamin B2 | 0.240 mg | 0.240 mg or 0.9 mg |
| Thiamin | 0.04 mg | 0.036 mg |
| Niacin | 0.09 mg | 0.081 mg |
| Vitamin B6 | 0.06 mg | 0.054 mg |
| Folate | 6 µg | 5.4 µg |
| Pantothenate | 0.32 mg | 0.288 mg |
| Vitamin D | 0.01 µg | 0.009 µg |
| Vitamin E | 0.04 mg | 0.036 mg |
| Magnesium | 11 mg | 9.9 mg |
| Chloride | 100 mg | 90 mg |
| Iron | 0.03 mg | 0.027 mg |
| Zinc | 0.4 mg | 0.36 mg |

In the invention the final milk product will maintain the organoleptic qualities with an acceptable level of sweetness and mouthfeel similar to or substantially the same to those of lactose containing milk counterpart outlined above. It is a feature of the reduced lactose or lactose free milk product that none, one or combination of vitamins, minerals, butterfat, protein can be manipulated as desired by the manufacturer. It is also a feature of the reduced lactose or lactose free milk product that it can be nutritionally superior to the lactose containing counterpart. The calorific content of the reduced lactose or lactose free milk product can be reduced significantly as desired.

Example 2

Characteristics of a Reduced Lactose Reduced Flavoured Milk Product

In this example a lactose reduced chocolate flavoured milk product was prepared which aims to have, in some cases, superior nutritional attributes similar nutritional profile to untreated milk using a 50% inclusion of lactose reduced or lactose free liquid.

Diluting the enzyme hydrolysed milk product to reduce the sweetness imported by the presence of glucose and galactose required reformulation of the concentration of protein, calcium, carbohydrate and fat to standardise the nutritional content of the chocolate flavoured reduced lactose milk compared to a lactose containing chocolate flavoured milk. It is optional to alter the nutritional aspects of the formulation as laid out in this example. It is also optional to simply add one or more of the following ingredients gums, stabilisers, starches or emulsifiers to increase the mouthfeel or body of the milk.

Protein

The addition of 50% lactose free or lactose reduced liquid to the reduced lactose milk resulted in a 50% reduction in protein content (4.5 g to 2.25 g per 100 ml). This 50% reduction includes the protein concentration in the reduced lactose milk and also any additional protein imparted by the ingredients added to produce chocolate flavoured reduced lactose milk. For the purposes of this example, flavouring and stabilising ingredients can be added with the 50% lactose free or lactose reduced liquid.

2.25 g/100 ml of protein will need to be added if the end product is to have a similar nutritional endpoint to the original non-treated counterpart. Alternatively, if the end product is to be a high protein drink then additional protein can be added. If a low protein final product is required it may not be necessary to add protein to the reduced lactose milk.

It is possible to use a single protein or a combination of proteins to reformulate the reduced lactose milk. Protein from one or more milk proteins selected from the following groups consisting of TMP (Total Milk protein), MPC (milk protein concentrate), MPI (milk protein isolate), zero lactose skimmed milk powder, WPI (whey protein isolate), casein, casein salts and WPC (whey protein concentrate), or any other suitable dairy protein is possible. The protein may also derive from a non-dairy vegetable or cereal protein source e.g. wheat, rice, soya proteins, or fungal source mycoproteins.

It is also possible to fortify the reduced lactose milk with protein in higher amounts than 50%. Alternatively, depending on the requirements for the final product, it may not be necessary to alter the protein concentration in the reduced lactose milk.

Calcium

The addition of 50% lactose free or lactose reduced liquid to the reduced lactose milk will have a 50% reduction knock on effect in calcium content (118 mg to 59 mg). If desired to equal the original calcium content it is possible to add any suitable calcium salt to levels of 59 mg/100 ml in order to meet 118 mg/100 ml as per the calcium content of the standard lactose containing milk. As is the case with all nutrients, it is possible to exceed the original nutritional values levels as desired. If a manufacturer wishes to reach 20% of the RDA for calcium for instance (160 mg per 100 ml where 800 mg is the RDA for Calcium) it is possible to add enough calcium (101 mg/100 ml in this case) to reach this level. The amount of calcium added is dependent on the amount of calcium required in the final product, taking into account the loss of some calcium due to further processing of the product for example heat treating.

One or more calcium salts selected for the following but not limited to carbonate, chloride, gluconate, lactate, phosphate or other suitable calcium salt can be used. Quantity required for the purposes of this example is 59 mg/100 ml to achieve 118 mg/100 ml as a desired quantity in the end product. In some circumstances, it may be necessary to overdose the levels of calcium to be added to the reduced lactose milk to overcome calcium content losses that may be associated with heat treatment or natural losses of calcium that may occur throughout shelf life.

It is also possible to fortify the reduced lactose milk with calcium up to a level of 150% RDA in the end product. Alternatively, depending on the requirements for the final product, it may not be necessary to alter the calcium concentration in the reduced lactose milk.

Fat

Fat content is also reduced in this example due to the addition of 50% lactose free or lactose reduced liquid to the lactose reduced milk (1.5 g/100 ml to 0.75 g per 100 ml). The remaining 0.3 g or so of fat comes from the chocolate ingredients. As outlined in Example 1 above, it is possible to separate the milk at a higher level (compared to standard lactose containing milk) in order to achieve a higher fat content. It is also possible to add lactose reduced/lactose free cream to achieve a different butterfat content if desired.

The first option is to separate and standardise the butterfat at a higher level to standard milk as part of this invention to achieve the desired endpoint. Butterfat standardisation would need to be 2.25 g/100 ml (0.75 g/100 ml to be compensated for) prior to addition of lactose free or lactose reduced liquid in order to achieve the desired endpoint of fat content 1.5 g/100 ml.

Calculation example of quantities of cream and skim phase of known butterfat contents is outlined herein.

| Lactose reduced Chocolate Milk 2.25% | | | |
|---|---|---|---|
| Butterfat % of components | Desired Fat % | % Quantity Required | |
| A. 0.07 | C. 2.25 | 94.5 | Milk |
| B. 40 | (C − A = D) D. 2.18 | 5.5 | Cream |
| | | 100 | |
| (B − A = F) F. 39.93 | (B − C = E) E. 37.75 | | |

The second option is to add cream at the same time as diluting the reduced lactose milk with lactose free or lactose reduced liquid in order to achieve 1.5 g fat per 100 ml. The example calculation will determine the quantity of cream of a known butterfat content to add to the milk.

It is also possible to standardise the fat content to any level desired from 0.01 g/100 ml to 12% (12 g/100 ml) butterfat for milk. Alternatively, depending on the requirements for the final product, it may not be necessary to alter the butterfat standardisation process in the reduced lactose milk.

Table 8 below details the nutritional content of reformulated reduced lactose chocolate flavoured semi-skimmed bovine milk compared to lactose containing semi-skimmed chocolate flavoured bovine milk.

TABLE 8

Typical Composition of nutrients per 100 ml of a standard lactose containing semi-skimmed chocolate flavoured bovine milk and a reduced lactose containing semi-skimmed chocolate flavoured bovine milk.

| Nutrient | lactose containing semi-skimmed chocolate flavoured bovine milk Average content per 100 ml | lactose reduced containing semi-skimmed chocolate flavoured bovine milk Average content per 100 ml |
|---|---|---|
| Energy (kcal) | 73 | 57.7 |
| Protein | 4.5 g | 4.5 g |
| Carbohydrate | 10.6 g | 8.1 g |
| of which sugars | 10.5 g | 8 g |
| of which glucose | 0 g | 1.2 g |
| of which galactose | 0 g | 1.2 g |
| of which lactose | 5.0 g | 100 mg |
| of which added sugars | 5 g | 5 g |
| Fat | 1.8 g | 1.05 g |
| of which saturates | 1.1 g | 0.6 g |
| Fibre | 0.3 g | 0.3 g |
| Sodium | 61 mg | 61 mg |
| Calcium | 118 mg | 118 mg |
| Vitamin B12 | 0.3 µg | 0.15 µg |
| Vitamin B2 | .170 mg | .085 mg |
| Thiamin | .04 mg | .02 mg |
| Niacin | .11 mg | .055 mg |
| Vitamin B6 | .03 mg | .015 mg |
| Folate | 2 µg | 1 µg |
| Pantothenate | .3 mg | .15 mg |
| Vitamin D | .01 ug | .005 ug |
| Vitamin E | .03 mg | .015 mg |
| Magnesium | 13 mg | 6.5 mg |
| Chloride | 110 mg | 55 mg |
| Iron | .23 mg | 0.12 mg |
| Zinc | 0.5 mg | 0.25 mg |

The invention is not limited to the embodiment hereinbefore described, with reference to the accompanying drawings, which may be varied in detail.

REFERENCES

1. Miller, G. D., et al., Benefits of dairy product consumption on blood pressure in humans: a summary of the biochemical literature. Journal of the American College of Nutrition, 2000. 19: p 1475-164S
2. Cho, E., S. A. Smith Warner, and D. Spiegelman, Dairy Foods, calcium and colorectal cancer: a pooled analysis of 10 cohort studies. Journal of the National Cancer Institute, 2004. 96: p 1015-1022
3. Bulhoes, A. C., et. al. (2007-11). "Correlation between lactose absorption and the C/T-13910 and G/A-22018 mutations of the lactase-phlorizin hydrolase (LCT) gene in adult-type hypolactasia". Brazilian Journal of Medical and Biological Research.
4. R. Bowen (Dec. 28, 2006). "Lactose Intolerance (Lactase Non-Persistence)". *Pathophysiology of the Digestive System*. Colorado State University
5. Villako, K. and H. Maaroos, Clinical picture of hypolactasia and lactose intolerance. Scand J Gastroenterol Suppl, 1994. 202: p 36-54
6. Scrimshaw, N. S. and E. B. Murray, The acceptability of milk and milk products in populations with a high prevalence of lactose intolerance. American Journal of Clinical Nutrition, 1988 48(Suppl 4): p. 1079-1159
7. Sahi T., Genetics and epidemiology of adult type hypolactasia. Scand J Gastroenterol Suppl, 1994. 202: p 7-20.
8. McGee, Harold (1984). "Milk and Dairy Products". *On Food and Cooking: The Science and Lore of the Kitchen*. New York: Charles Scribner's Sons. pp. 3-53. ISBN 0-684-18132-0.
9. Hargrove, James L.; Berdanier, Carolyn D. (1993). *Nutrition and gene expression*. Boca Raton: CRC Press. ISBN 0-8493-6961-4.

The invention claimed is:

1. A process for preparing a reduced-lactose or lactose-free mammalian milk product comprising the steps of:
    (a) enzymatically hydrolysing the lactose present in mammalian milk which has not been subjected to any of filtration separation, membrane separation and chromatographic separation technology;
    (b) diluting the enzymatically hydrolysed milk with water to reduce the sweetness imparted by the presence of glucose and galactose; and
    (c) reformulating the diluted enzymatically hydrolysed milk to provide a reduced-lactose or lactose-free milk product;
    wherein the process does not use by-products, including permeate and retentate of filtration technology.

2. The process as claimed in claim 1 wherein the hydrolysed milk comprises about 1% w/v or less lactose.

3. The process as claimed in claim 1 wherein the hydrolysed milk comprises about 0.5% w/v or less lactose.

4. The process as claimed in claim 1 wherein the hydrolysed milk comprises about 0.1% w/v or less lactose.

5. The process as claimed in claim 1 wherein water is added at a concentration of between about 5% v/v to about 60% v/v.

6. The process as claimed in claim 5 wherein water is added at a concentration of between about 10% v/v to about 50% v/v.

7. The process as claimed in claim 1 wherein water is added at a temperature between about 1° C. to about 45° C.

8. The process as claimed in claim 1 wherein step (c) comprises adding a protein to the diluted enzymatically hydrolysed milk.

9. The process as claimed in claim 1 wherein step (c) comprises adding a mineral to the diluted enzymatically hydrolysed milk.

10. The process as claimed in claim 1 wherein step (c) comprises adding a vitamin to the diluted enzymatically hydrolysed milk.

11. The process as claimed in claim 1 wherein step (c) comprises adding a gum to the diluted enzymatically hydrolysed milk.

12. The process as claimed in claim 1 wherein step (c) comprises adding a starch to the diluted enzymatically hydrolysed milk.

13. The process as claimed in claim 1 wherein step (c) comprises adding a stabiliser to the diluted enzymatically hydrolysed milk.

14. The process as claimed in claim 1 wherein step (c) comprises adding an emulsifier to the diluted enzymatically hydrolysed milk.

15. The process as claimed in claim 8 wherein the protein is a milk protein.

16. The process as claimed in claim 15 wherein the protein is selected from one or more of: total milk protein, milk protein concentrate, milk protein isolate, zero lactose skimmed milk powder, whey protein isolate, casein, casein salts, and whey protein concentrate.

17. The process as claimed in claim 8 wherein the protein is of a vegetable or cereal source.

18. The process as claimed in claim 8 wherein the protein is added at a concentration of at least 1% w/v.

19. The process as claimed in claim 8 wherein the protein is added at a concentration of at least 10% w/v.

20. The process as claimed in claim 9 wherein the mineral is selected from one or more of sodium, potassium, calcium, magnesium, phosphorous, chloride, iron, iodine, selenium, molybdenum, manganese, fluoride, nickel, sulphur, copper and zinc.

21. The process as claimed in claim 9 wherein the mineral is added at a concentration of at least 0.0001% w/v.

22. The process as claimed in claim 9 wherein the mineral is added at a concentration of at least 15% of the recommended daily allowance.

23. The process as claimed in claim 10 wherein the vitamin is selected from one or more of vitamin A, vitamin B, vitamin C, vitamin D, vitamin E, and vitamin K.

24. The process as claimed in claim 23 wherein vitamin A is added in a retinol form or its equivalent.

25. The process as claimed in claim 23 wherein vitamin B is added one or more of the forms: vitamin $B_1$ (thiamine), vitamin $B_2$ (riboflavin), vitamin $B_3$ (niacin), vitamin $B_5$ (pantothenic acid), vitamin $B_6$ (pyridoxine), vitamin $B_7$ (biotin), vitamin $B_9$ (folic acid), vitamin $B_{12}$ (cobalamin), and vitamin B equivalent.

26. The process as claimed in claim 23 wherein vitamin D is added in the form of one or both of: vitamin $D_2$ (ergocalciferol), vitamin $D_3$ (cholecalciferol), and vitamin D equivalent.

27. The process as claimed in claim 23 wherein vitamin E is added in the alpha-tocopherol form or vitamin E equivalent.

28. The process as claimed in claim 23 wherein vitamin K is added in the form of one or a combination of: Phytomenadione, menaquinone-4, menaquinone-7, or vitamin K equivalent.

29. The process as claimed in claim 10 wherein the vitamin is added at a concentration of at least 0.0001% w/v.

30. The process as claimed in claim 10 wherein the vitamin is added at a concentration of at least 15% of the recommended daily allowance.

31. The process as claimed in claim 1 comprising the step of adjusting the amount of butterfat in the milk to compensate for the dilution with water.

32. The process as claimed in claim 1 wherein the milk is enzymatically hydrolysed with a lactose and/or B-galactosidase enzyme.

33. The process as claimed in claim 32 wherein the enzyme is present at a concentration between about 0.01% w/v to about 0.5% w/v.

34. The process as claimed in claim 1 wherein the milk is enzymatically hydrolysed for between about 2 hours to about 36 hours.

35. The process as claimed in claim 1 wherein the milk in enzymatically hydrolysed at a temperature between about 1° C. to about 45° C.

36. The process as claimed in claim 1 comprising one or more of the processing steps selected from: vacuum de-aeration, pasteurisation, bactofugation, homogenisation, separation into cream and skim fractions, and fat content standardisation prior to step (a).

37. The process as claimed in claim 1 comprising one or more of the processing steps selected from: spray drying, whipping, churning, aerating following step (b) or (c), and pasteurising if raw milk is used.

38. The process as claimed in claim 1 wherein the mammalian milk source is one or more of cows, goats, sheep, horses, donkeys, camels, buffalo, yaks, reindeer, moose, and humans.

\* \* \* \* \*